United States Patent
Hakuta et al.

(10) Patent No.: US 7,741,394 B2
(45) Date of Patent: Jun. 22, 2010

(54) RUBBER COMPOSITION AND USES THEREOF

(75) Inventors: Takashi Hakuta, Sodegaura (JP); Kuniyoshi Kawasaki, Amphur Muang (TH)

(73) Assignees: Mitsui Chemicals, Inc., Tokyo (JP); NOK Corporation, Tokyo (JP)

( * ) Notice: Subject to any disclaimer, the term of this patent is extended or adjusted under 35 U.S.C. 154(b) by 64 days.

(21) Appl. No.: 11/922,705

(22) PCT Filed: Jun. 28, 2006

(86) PCT No.: PCT/JP2006/312860

§ 371 (c)(1),
(2), (4) Date: Dec. 21, 2007

(87) PCT Pub. No.: WO2007/004481

PCT Pub. Date: Jan. 11, 2007

(65) Prior Publication Data

US 2009/0118404 A1    May 7, 2009

(30) Foreign Application Priority Data

Jun. 30, 2005    (JP) .............................. 2005-191879

(51) Int. Cl.
*C08K 5/24*    (2006.01)
*C08K 5/54*    (2006.01)
(52) U.S. Cl. ...................... 524/266; 524/268
(58) Field of Classification Search .................. 524/266
See application file for complete search history.

(56) References Cited

U.S. PATENT DOCUMENTS 3,944,519 A * 3/1976 Mink et al. ................. 525/478

2005/0020740 A1 * 1/2005 Matsunaga et al. .......... 524/261
2006/0142437 A1 * 6/2006 Hakuta et al. ................. 524/81

FOREIGN PATENT DOCUMENTS

| EP | 1 605 015 A1 | 12/2005 |
|---|---|---|
| JP | 2517797 | 5/1996 |
| JP | 2961068 | 7/1999 |
| JP | 2002-30185 | 1/2002 |
| JP | 2002-371152 | 12/2002 |
| WO | WO 00/55251 | 9/2000 |
| WO | WO 01/98407 A1 | 12/2001 |
| WO | WO 03/005777 A1 | 7/2003 |
| WO | WO 2004/083299 A1 | 9/2004 |

OTHER PUBLICATIONS

STIC search results.*
Supplementary European Search Report mailed May 8, 2009, received in corresponding European Application No. 06767477.0 (5 pgs.).

* cited by examiner

*Primary Examiner*—Ling-Siu Choi
*Assistant Examiner*—Hui Chin
(74) *Attorney, Agent, or Firm*—Foley & Lardner LLP

(57) ABSTRACT

It is an object of the present invention to provide a rubber composition which has been improved in mechanical properties with maintaining excellent various properties and is favorably used for a fuel cell sealing member, a hard disc drive top cover gasket member and an electric wire connector sealing member. It is another object of the present invention to provide main bodies mounted with the above respective members obtained by the use of the rubber composition. The rubber composition of the invention comprises a specific ethylene/α-olefin/non-conjugated polyene copolymer in which the non-conjugated polyene is a norbornene-based compound, a specific SiH group-containing compound, and if necessary, an organopolysiloxane. Such a rubber composition of the invention is excellent in mechanical properties and can be particularly favorably used for a fuel cell sealing member, a hard disc drive top cover gasket, an electric wire connector sealing member, etc.

15 Claims, 1 Drawing Sheet

RUBBER COMPOSITION AND USES THEREOF

TECHNICAL FIELD

The present invention relates to a rubber composition favorably used for fuel cell sealing members, hard disc drive top cover gaskets, electric wire connector sealing members, etc., and more particularly to a rubber composition having particularly excellent mechanical properties in addition to excellent various properties inherent in the conventional rubbers which have been applied to such uses.

The present invention also relates to a fuel cell sealing member, a hard disc drive top cover gasket, an electric wire connector sealing member obtained by the use of the rubber composition, and main bodies mounted with such members.

BACKGROUND ART

Fuel cells are efficient clean power generation systems, and in recent years, the fuel cells have been paid attention as novel energy systems for automobiles and home uses. For cell sealing members for the fuel cells, low-cost materials excellent in heat resistance, acid resistance, resistance to permeation of gases and high-speed moldability are desired, and in the existing circumstances, a fluororubber is applied from the viewpoints of heat resistance and acid resistance, a butyl rubber is applied from the viewpoint of resistance to permeation of gases, and a silicone rubber is applied from the viewpoints of heat resistance and moldability. To meet the requirement of high-speed moldability, however, usual materials are insufficient, and in this case, a method in which a liquid silicone rubber is used and LIM (liquid injection molding) is applied has been considered.

Although the silicone rubber is excellent in heat resistance and high-speed moldability, it is inferior in acid resistance and resistance to permeation of gases, and the power generation performance of the existing fuel cells is low. Therefore, studies of improvements in the power generation performance have been promoted. As the power generation performance is enhanced in future, the reaction temperature in the cell or the like tends to become higher. On that account, performance at higher temperatures is required also for the sealing materials.

Then, a rubber composition that has solved the above problems, i.e., problems of moldability and heat resistance, has been developed. This rubber composition is excellent in high-speed molding and is favorably used for fuel cell sealing members having excellent heat resistance, acid resistance and resistance to permeation of gases (patent document 3). However, specific fuel cell sealing members sometimes exhibit insufficient mechanical properties.

As the electronic equipment manufactured articles are downsized and the performance thereof is enhanced, making their component parts smaller and thinner is required. However, if the component parts are made smaller, assembly workability in the manufacturing is deteriorated. Therefore, uniting or combining various parts in one is required. In the case of a gasket for a hard disc drive that is an electronic memory device, for example, a method in which a single rubber or a foamed urethane sheet is interposed by a metal cover, such as a stainless steel cover or an aluminum cover, and they are bonded with an adhesive to unite them in one has been proposed (patent document 1).

However, if the gasket has high hardness (counterforce) in the adoption of the above uniting method, a problem of deformation of the metal cover occurs because the metal cover has been made lightweight and thin.

Then, a styrene-based thermoplastic elastomer has been disclosed as a gasket material (patent document 2). It is described that because the styrene-based thermoplastic elastomer has low hardness and needs no vulcanizing step differently from the rubber materials, simplification of the production process and recycling are possible.

However, because of generation of heat due to enhancement of performance (high rotational speed) of the hard disc drive and because of adoption of such a material in automobiles, the material tends to be exposed to higher temperatures (particularly not lower than 80° C.) in the use environment. In such environment, the conventional styrene-based thermoplastic elastomer suffers a problem of permanent set at high temperatures that is one of mechanical properties, and there is limitation on the performance.

Electric wire connectors serve to connect and branch electric wires, and comprise a pair of male and female resin frames capable of being connected through one-touch operation, an electric wire and a sealing member. The sealing member is mainly used as a dust seal between the electric wire and the resin frame. For the electric wire connector sealing member applied to use of this kind, sealing properties against thin electric wires and insertion properties are required, and in the past, a silicone rubber and a nitrile rubber, which are of low hardness and oil-bleeding type, have been employed.

These rubbers, however, mainly contain a silicone oil as a plasticizer and therefore have a problem that the plasticizer adheres to electric contact points during the use to cause insulation at the electric contact points and thereby bring about troubles in the flow of electric current.

Then, a rubber composition that has solved the above problem has been developed and favorably used for electric wire connector sealing members (patent document 3).

However, a requirement of enhancing mechanical properties for the electric wire connectors has been also increased. In the case of the conventional sealing members, the crosslinking rate after vacuum defoaming is sometimes lowered, and in addition, mechanical properties are insufficient. Therefore, improvement of properties has been desired.

Patent document 1: Japanese Patent No. 2517797
Patent document 2: Japanese Patent No. 2961068
Patent document 3: International Publication WO 03/057777

DISCLOSURE OF THE INVENTION

Problem to be Solved by the Invention

It is an object of the present invention to provide a rubber composition which has been improved in mechanical properties with maintaining excellent various properties and is favorably used for fuel cell sealing members, hard disc drive top cover gasket members and electric wire connector sealing members. It is another object of the present invention to provide main bodies mounted with the above respective members obtained by the use of the rubber composition.

Means to Solve the Problem

The present invention relates to the following matters (1) to (15).

(1) A rubber composition comprising:
an ethylene/α-olefin/non-conjugated polyene copolymer [A] satisfying the following (a) to (f):
(a) the copolymer [A] is a copolymer of ethylene, an α-olefin and a non-conjugated polyene,
(b) the number of carbon atoms of the α-olefin is in the range of 3 to 20, (c) the ethylene unit/α-olefin unit weight ratio is in the range of 35/65 to 95/5, (d) the iodine value is in the range of 0.5 to 50, (e) the intrinsic viscosity [η], as measured in a decalin solution at 135° C., is in the range of 0.01 to 5.0 dl/g, and (f) the non-conjugated polyene is at least one norbornene compound represented by the following formula [I]:

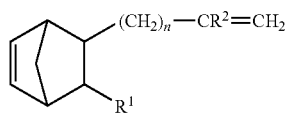
[I]

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms, and a SiH group-containing compound [C] which has two SiH groups in one molecule and is represented by the following formula [II]:

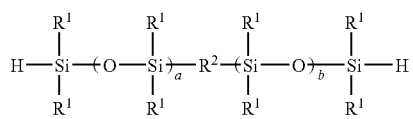
[II]

wherein $R^1$ is a monovalent group of 1 to 10 carbon atoms and is an unsubstituted or substituted saturated hydrocarbon group or aromatic hydrocarbon group, each $R^1$ may be the same or different in one molecule, a is an integer of 0 to 20, b is an integer of 0 to 20, and $R^2$ is a divalent organic group of 1 to 30 carbon atoms or an oxygen atom.

(2) The rubber composition as stated in the above (1), which further comprises an organopolysiloxane [B] having, as a mean composition formula, the following formula [S]:

$$R^1_t SiO_{(4-t)/2}$$ (S)

wherein $R^1$ is a monovalent hydrocarbon group of 1 to 10 carbon atoms, a part or all of hydrogen atoms of the monovalent hydrocarbon group may be replaced with cyano groups or halogen atoms, and t is a number of 1.9 to 2.1, in said rubber composition, the [A]:[B] weight ratio being in the range of 99.9:0.1 to 5:95.

(3) The rubber composition as stated in the above (1) or (2), wherein the SiH group-containing compound [C] is a compound represented by the following formula [III]:

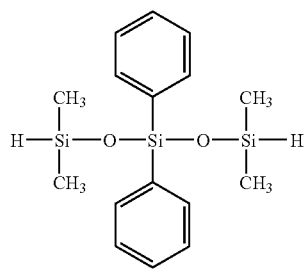
[III]

(4) The rubber composition as stated in the above (1) or (2), wherein the SiH group-containing compound [C] is a compound represented by the following formula [IV]:

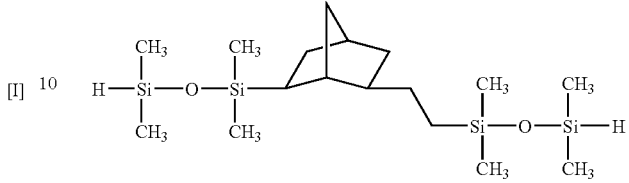
[IV]

(5) A fuel cell sealing member comprising the rubber composition of any one of the above (1) to (4).

(6) The fuel cell sealing member as stated in the above (5), which is void-free.

(7) The fuel cell sealing member as stated in the above (5) or (6), which has a volume intrinsic resistivity of not less than $1 \times 10^{10}$ Ω·cm.

(8) A fuel cell having the fuel cell sealing member of any one of the above (5) to (7).

(9) A hard disc drive top cover gasket comprising the rubber composition of any one of the above (1) to (4).

(10) The hard disc drive top cover gasket as stated in the above (9), which is void-free.

(11) The hard disc drive top cover gasket as stated in the above (9) or (10), wherein a hard disc drive top cover and a gasket are united in one with an adhesive.

(12) A hard disc drive having the hard disc drive top cover gasket of any one of the above (9) to (11).

(13) An electric wire connector sealing member comprising the rubber composition of any one of the above (1) to (4).

(14) The electric wire connector sealing member as stated in the above (13), which has a durometer A hardness of not more than 45.

(15) An electric wire having the electric wire connector sealing member of the above (13) or (14).

Effect of the Invention

The rubber composition of the invention exhibit excellent mechanical properties with maintaining excellent various properties inherent in rubber materials which have been hitherto used for fuel cell sealing members, hard disc drive top cover gaskets, electric wire connector sealing members, etc. Therefore, the rubber composition can be favorably applied to such uses and is excellent also in high-speed moldability. By the use of the rubber composition of the invention, processes for assembling fuel cells, hard disc drives, electric wire connectors, etc. which are main bodies mounted with the above members can be simplified, their lives can be prolonged, and uses thereof in the high-temperature environment become possible.

According to the present invention, further, there can be provided (1) a fuel cell sealing member, which is excellent in mechanical properties, heat resistance, acid resistance and resistance to permeation of gasses (gas barrier properties), and a fuel cell having the sealing member, (2) a hard disc drive top cover gasket, which has low hardness, is excellent in mechanical properties, heat resistance and compression set properties and exhibits excellent sealing properties over a long period of time, and a hard disc drive having the gasket, and (3) an electric wire connector sealing member, which is free from oil bleeding and is excellent in sealing properties against electric wires and insertion properties, and an electric connector having the sealing member and favorably used for automobiles and the like.

DESCRIPTION OF SYMBOLS

Figure 1:
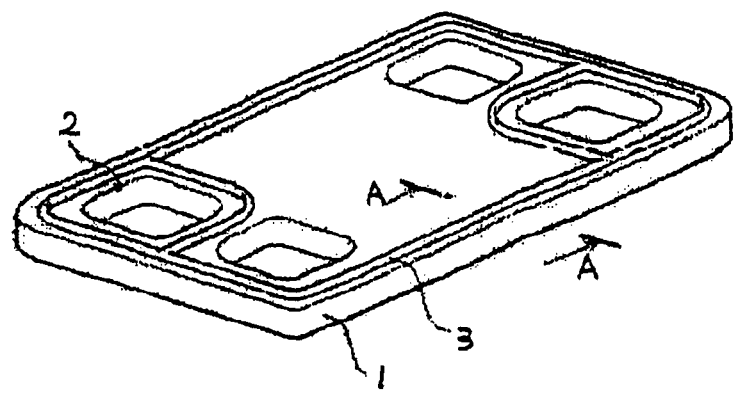
FIG. 1 is a perspective view showing one embodiment of a separator-integrated cell sealing part for a fuel cell.

1: carbon, metal or resin separator of separator-integrated cell for fuel cell
2: air space
3: sealing part of cell
11: sealing member or rubber material
12: SUS jig
13: water bath
14: water
15: sealed portion
16: air feed or air pump
A: place to give section of FIG. 2

BEST MODE FOR CARRYING OUT THE INVENTION

The rubber composition of the invention and uses thereof are described in detail hereinafter.

Rubber Composition

The rubber composition of the invention comprises an ethylene/α-olefin/non-conjugated polyene copolymer [A] (abbreviated to "copolymer [A]" simply hereinafter), a SiH group-containing compound [C], and if necessary, an organopolysiloxane [B].

Ethylene/α-Olefin/Non-Conjugated Polyene Copolymer A

The copolymer [A] for use in the invention is a copolymer of ethylene, an α-olefin of 3 to 20 carbon atoms and a non-conjugated polyene, and is preferably a random copolymer thereof.

α-Olefin

The α-olefin to constitute the copolymer [A] is an α-olefin of 3 to 20 carbon atoms. Examples of such α-olefins include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene 1-nonadecene, 1-eicosene, 9-methyl-1-decene, 11-methyl-1-dodecene and 12-ethyl-1-tetradecene. Of these, α-olefins of 3 to 10 carbon atoms are preferable, and particularly, propylene, 1-butene, 1-hexene and 1-octene are most preferably used. These α-olefins are used singly or in combination of two or more kinds.

Non-Conjugated Polyene

The non-conjugated polyene to constitute the copolymer [A] is at least one norbornene compound represented by the following formula [I]:

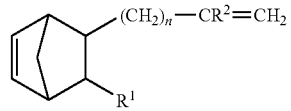

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms.

Examples of the norbornene compounds represented by the formula [I] include 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl) 2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene and 5-(1,2,3-trimethyl-4-pentenyl)-2-norbornene.

Of these, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene are preferable. These norbornene compounds can be used singly or in combination of two or more kinds.

In the present invention, other non-conjugated polyenes can be used in combination with the norbornene compound represented by the formula [I], within limits not detrimental to the properties that are objects of the present invention. Although there is no specific limitation on the non-conjugated polyenes employable herein, the following chain non-conjugated dienes, alicyclic non-conjugated dienes and triene compounds are used, and they can be used singly or in combination of two or more kinds.

Examples of the chain non-conjugated dienes include 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene.

Examples of the cyclic non-conjugated dienes include 5-methylene-2-norbornene, 1-methyl-5-methylene-2-norbornene, 1-ethyl-5-methylene-2-norbornene, 5-ethylidene-2-norbornene, 5-isopropylidene-2-norbornene, 5-vinylidene-2-norbornene, 6-chloromethyl-5-isopropenyl-2-norbornene, dicyclopentadiene and methyltetrahydroindene.

Examples of other compounds than the above compounds include trienes, such as 2,3-diisopropylidene-5-norbornene, 2-ethylidene-3-isopropylidene-5-norbornene and 2-propenyl-2,2-norbornadiene.

Composition and Properties of Copolymer [A]

Compositional Ratio of Repeating Units

In the copolymer [A] for the invention, the ethylene unit/α-olefin unit ratio by weight is in the range of 35/65 to 95/5, preferably 40/60 to 90/10, more preferably 45/55 to 85/15, particularly preferably 50/50 to 80/20.

When the weight ratio is in the above range, a rubber composition capable of providing a crosslinked rubber molding excellent not only in heat aging resistance, strength properties and elastomeric properties but also in low-temperature resistance and workability is obtained.

Iodine Value

The iodine value of the copolymer [A] for the invention is in the range of 0.5 to 50 (g/100 g), preferably 1 to 45 (g/100 g), more preferably 1 to 43 (g/100 g), particularly preferably 3 to 40 (g/100 g).

When the iodine value is in the above range, a rubber composition having high crosslinking efficiency is obtained, and a rubber composition capable of providing a crosslinked rubber molding excellent not only in compression set resistance but also in resistance to environmental deterioration (i.e., heat aging resistance) is obtained. If the iodine value exceeds the upper limit of the above range, the crosslink density becomes too high and mechanical properties such as tensile elongation are lowered in some cases.

Intrinsic Viscosity

The intrinsic viscosity [η] of the copolymer [A] for the invention, as measured in decalin at 135° C., is in the range of 0.01 to 5.0 dl/g, preferably 0.03 to 4.0 dl/g, more preferably 0.05 to 3.5 dl/g, particularly preferably 0.07 to 3.0 dl/g. An embodiment wherein the intrinsic viscosity [η] of the copolymer [A] is not more than 0.5 dl/g, preferably less than 0.3 dl/g, is favorable especially for subjecting the rubber composition to LIM molding. When the intrinsic viscosity [η] is in the above range, a rubber composition capable of providing a crosslinked rubber molding excellent not only in strength properties and compression set resistance but also in workability is obtained.

Process for Preparing Copolymer [A]

The copolymer [A] for the invention can be prepared by copolymerizing ethylene, an α-olefin and a non-conjugated polyene such as the aforesaid norbornene compound represented by the formula [I] in the presence of a polymerization catalyst. More specifically, the copolymer [A] can be preferably prepared by such processes hitherto publicly known as described in, for example, "Polymer Production Process" (published by Kogyo Chousakai Publishing Inc., pp. 365-378), Japanese Patent Laid-Open Publication No. 71617/1997, Japanese Patent Laid-Open Publication No. 71618/1997, Japanese Patent Laid-Open Publication No. 208615/1997, Japanese Patent Laid-Open Publication No. 67823/1998, Japanese Patent Laid-Open Publication No. 67824/1998 and Japanese Patent Laid-Open Publication No. 110054/1998.

As the polymerization catalyst, a Ziegler catalyst comprising a transition metal compound, such as a compound of vanadium (V), zirconium (Zr) or titanium (Ti), and an organoaluminum compound (organoaluminum oxy compound), or a metallocene catalyst comprising a metallocene compound of a transition metal selected from group IVB of the periodic table of elements and either an organoaluminum oxy compound or an ionizing ionic compound is preferably employed.

More specifically, the copolymer [A] for the invention can be desirably prepared by copolymerizing ethylene, an α-olefin and the aforesaid non-conjugated polyene, particularly preferably a norbornene compound having a vinyl group, in the presence of a catalyst containing the following vanadium compound (a) and the following organoaluminum compound (b) as main ingredients under the conditions of a polymerization temperature of 30 to 60° C., particularly 30 to 50° C., a polymerization pressure of 4 to 12 kgf/cm², particularly 5 to 8 kgf/cm², and a molar ratio of a non-conjugated polyene feed to an ethylene feed (non-conjugated polyene/ethylene) of 0.01 to 0.2. The copolymerization is preferably carried out in a hydrocarbon medium.

The vanadium compound (a) is, for example, a vanadium compound represented by the formula $VO(OR)_a X_b$ or $V(OR)_c X_d$ (wherein R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$), or an electron donor adduct thereof.

Specific examples of the vanadium compounds (a) include $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_3$, $VCl_4$, $VOCl_3$, $VO(O\text{-n-}C_4H_9)_3$ and $VCl_3 \cdot 2OC_6H_{12}OH$.

Examples of the organoaluminum compounds (b) include:

trialkylaluminums, such as triethylaluminum, tributylaluminum and triisopropylaluminum; dialkylaluminum alkoxides, such as diethylaluminum ethoxide and dibutylaluminum butoxide; alkylaluminum sesquialkoxides, such as ethylaluminum sesquiethoxide and butylaluminum sesquibutoxide;

partially alkoxylated alkylaluminums having a mean composition represented by $R_{0.5}Al(OR)_{0.5}$ or the like; partially halogenated alkylaluminums, e.g., dialkylaluminum halides, such as diethylaluminum chloride, dibutylaluminum chloride and diethylaluminum bromide, alkylaluminum sesquihalides, such as ethylaluminum sesquichloride, butylaluminum sesquichloride and ethylaluminum sesquibromide, and alkylaluminum dihalides, such as ethylaluminum dichloride, propylaluminum dichloride and butylaluminum dibromide; partially hydrogenated alkylaluminums, e.g., dialkylaluminum hydrides, such as diethylaluminum hydride and dibutylaluminum hydride, and alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Polyorganosiloxane [B]

The organopolysiloxane [B] that is used in the invention when needed has a function of improving heat aging resistance of a rubber composition, and contributes to improving heat aging resistance of fuel cell sealing members, hard disc drive top cover gaskets and electric wire connector sealing members.

When the rubber composition of the invention contains the organopolysiloxane [B], the content thereof is such an amount that the weight ratio between the ethylene/α-olefin/non-conjugated polyene copolymer [A] and the organopolysiloxane [B], [A]:[B] by weight, is in the range of 99.9:0.1 to 5:95.

The organopolysiloxane [B] has, as a mean composition formula, the following formula (S):

$$R^1_t SiO_{(4-t)/2} \qquad (S)$$

wherein $R^1$ is a monovalent hydrocarbon group of 1 to 10 carbon atoms, a part or all of hydrogen atoms of the monovalent hydrocarbon group may be replaced with cyano groups or halogen atoms, and t is a number of 1.9 to 2.1.

Examples of the groups indicated by $R^1$ in the formula (S) include alkyl groups, such as methyl, ethyl, propyl, butyl, hexyl and octyl; cycloalkyl groups, such as cyclopentyl and cyclohexyl; alkenyl groups, such as vinyl, allyl and propenyl; cycloalkenyl groups, such as cyclopentenyl and cyclohexenyl; aryl groups, such as phenyl, tolyl and xylyl; and aralkyl groups, such as benzyl and phenylethyl. In these groups, a part or all of hydrogen atoms may be replaced with chlorine atoms, fluorine atoms or cyano groups.

As the organopolysiloxane [B], an organopolysiloxane having a dimethylsiloxane unit in the main chain, or an organopolysiloxane wherein into a part of a main chain of dimethylpolysiloxane is introduced a diphenylsiloxane unit having a phenyl group, a methylvinylsiloxane unit having a vinyl group, a methyl-3,3,3-trifluoropropylsiloxane unit having a 3,3,3-trifluoropropyl group, or the like is particularly preferable.

The organopolysiloxane [B] is preferably an organopolysiloxane having two or more aliphatic unsaturated groups, such as alkenyl groups or cycloalkenyl groups, in one molecule, and is particularly preferably an organopolysiloxane wherein the amount of the aliphatic unsaturated groups, particularly vinyl groups, in $R^1$ is in the range of 0.01 to 20% by mol, particularly 0.02 to 10% by mol. Although the aliphatic unsaturated group may be present at an end of the molecular chain, midway the molecular chain or both of them, it is preferably present at least at an end of the molecular chain. The end of the molecular chain is, for example, one capped with a trimethylsilyl group, a dimethylphenylsilyl group, a dimethylhydroxysilyl group, a dimethylvinylsilyl group, a trivinylsilyl group or the like.

The organopolysiloxane [B] for use in the invention is particularly preferably methylvinylpolysiloxane, methylphenylvinylpolysiloxane, methyltrifluoropropylvinylpolysiloxane or the like.

The organopolysiloxane [B] can be obtained by, for example, (co)hydrolysis-condensing one or more organohalogenosilanes or ring-opening polymerizing cyclic polysiloxane (trimer or tetramer of siloxane) using an alkaline or acid catalyst. Although the organopolysiloxane obtained by either method is basically a straight-chain diorganopolysiloxane, it may be a mixture of two or more kinds having different molecular structures.

The organopolysiloxane [B] can be obtained as a commercially available one or can be synthesized by a disclosed and publicly known process.

The organopolysiloxane [B] has a degree of polymerization of preferably not less than 100, particularly preferably 3,000 to 20,000, and has a viscosity at 25° C. of preferably not less than 100 centistokes (cSt), particularly preferably 100,000 to 100,000,000 cSt.

SiH Group-Containing Compound [C]

The SiH group-containing compound [C] for use in the invention is represented by the formula [II]:

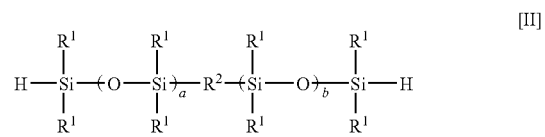

wherein $R^1$ is a monovalent group of 1 to 10 carbon atoms and is an unsubstituted or substituted saturated hydrocarbon group or aromatic hydrocarbon group, each $R^1$ may be the same or different in one molecule, a is an integer of 0 to 20, b is an integer of 0 to 20, and $R^2$ is a divalent organic group of 1 to 30 carbon atoms or an oxygen atom.

Such a SiH group-containing compound [C] is characterized by having SiH groups at the both ends of a molecule and having two SiH groups per molecule. Examples of the groups indicated by $R^1$ in the formula [II] include methyl, ethyl, propyl, isopropyl, butyl, amyl, cyclopentyl, hexyl, cyclohexyl, octyl, chloromethyl, 2-chloroethyl, 3-chloropropyl, phenyl, phenylmethyl, 2-phenylethyl and 2-phenylpropyl. Of these, preferable are methyl, ethyl and phenyl. a is an integer of 0 to 20, and b is an integer of 0 to 20. a and b are each preferably 10 or less, more preferably 5 or less, particularly preferably 2 or less. It is most preferable that a and b are equal to each other and are each 2 or less.

Specific examples of the compounds represented by the formula [II] are given below. Examples of $R^2$ in the formula [II] are equal to divalent groups corresponding to the specific examples of the compounds. These SiH group-containing compounds [C] can be used singly or by mixing two or more kinds. The SiH group-containing compound [C] can be synthesized by a disclosed and publicly known process.

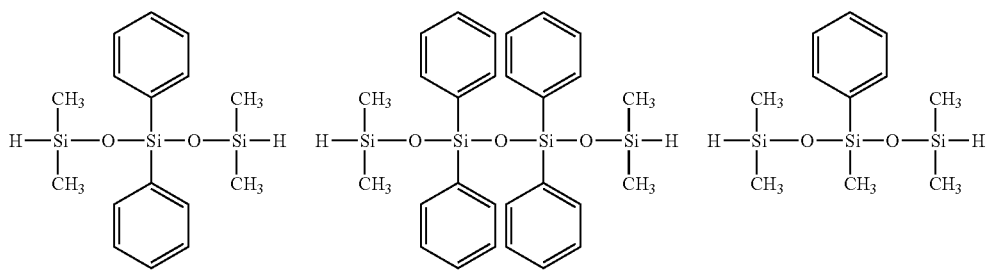

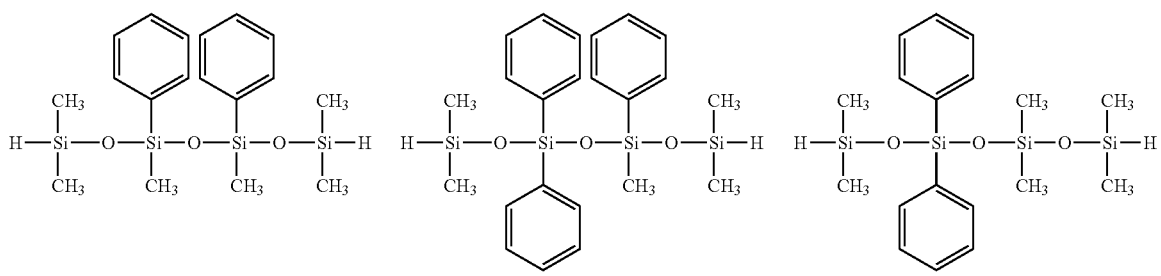

-continued
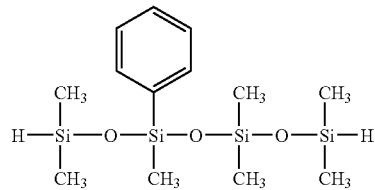
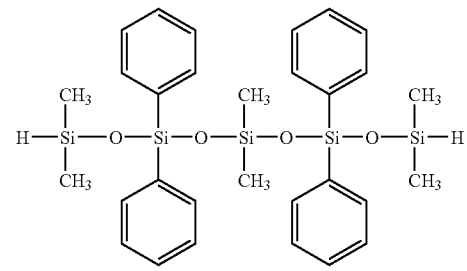
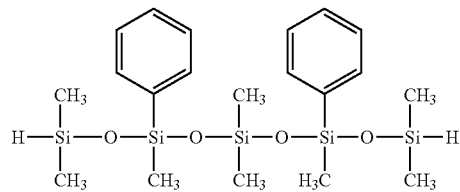
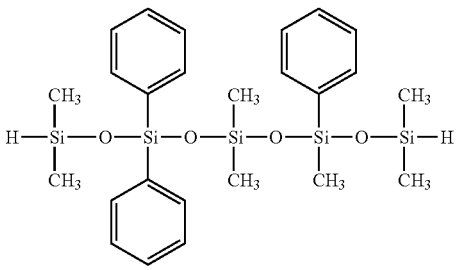
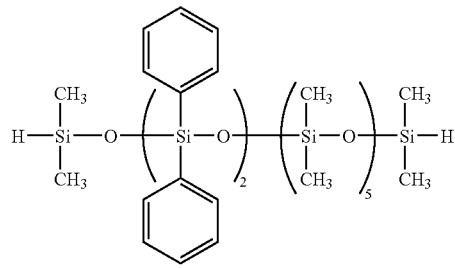
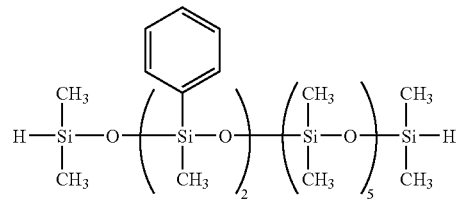
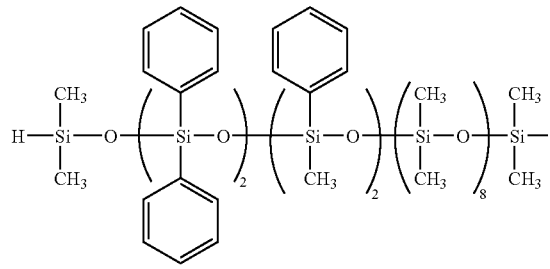
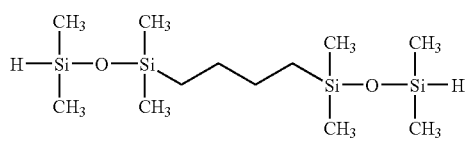
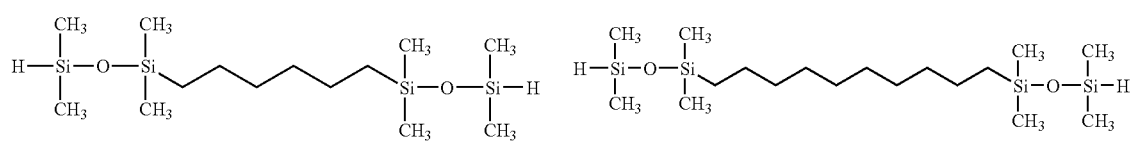
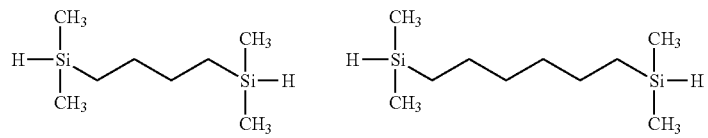
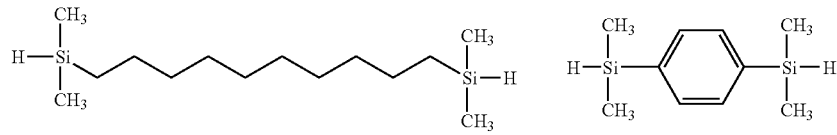
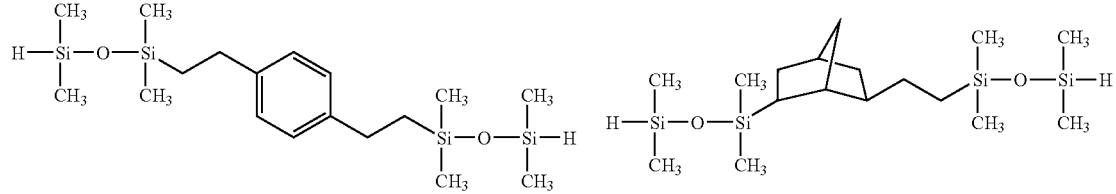

-continued

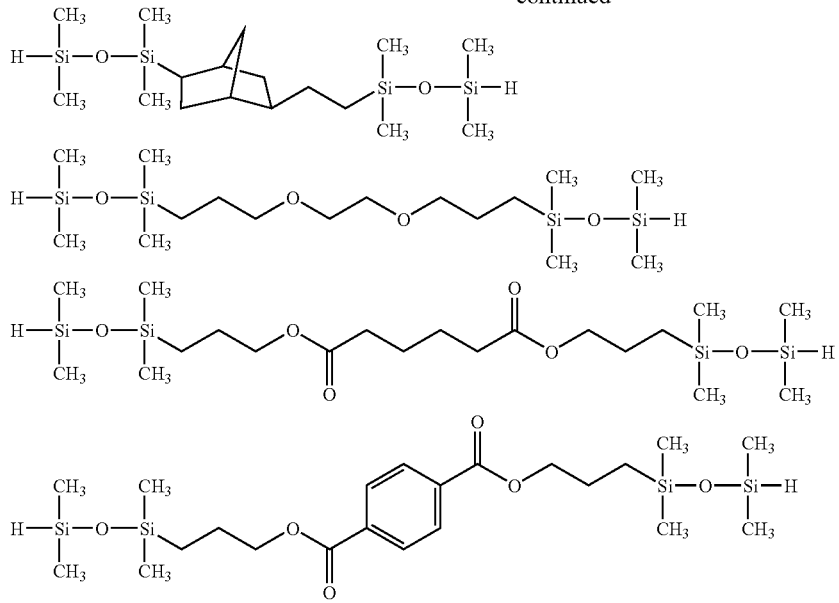

The SiH group-containing compound [c] particularly preferably used in the invention is a compound represented by the formula [III] or the formula [IV]. By the use of such a compound, a fuel cell sealing member, a hard disc drive top cover gasket and an electric wire connector sealing member having most excellent properties, which have been further improved in mechanical properties with maintaining the conventional excellent various properties, can be obtained.

[III]

[IV]

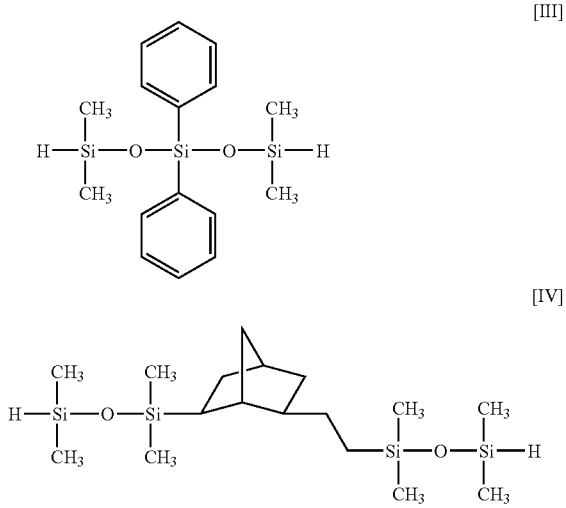

Such a SiH group-containing compound [C] is preferably contained in such an amount as to give 0.2 to 10 hydrogen atoms that are bonded to silicon atoms, based on one aliphatic unsaturated bond contained in the copolymer [A] and the organopolysiloxane [B].

Constitution of Rubber Composition

The rubber composition of the invention comprises the copolymer [A], the SiH group-containing compound [C], and if necessary, the organopolysiloxane [B], and the rubber composition further contains the later-described catalyst, reaction inhibitor and other components, when needed.

In the rubber composition, the weight ratio between the copolymer [A] and the organopolysiloxane [B], [A]:[B] by weight, is in the range of 100:0 to 5:95, preferably 100:0 to 60:40, more preferably 100:0 to 70:30. In the present invention, an embodiment wherein the organopolysiloxane [B] is not contained at all is also one embodiment, and when the rubber composition contains the organopolysiloxane [B], the weight ratio between the copolymer [A] and the organopolysiloxane [B], [A]:[B] by weight, is in the range of 99.9:0.1 to 5:95.

Process for Preparing Rubber Composition Preparation

The rubber composition of the invention is prepared by the following process. By the use of internal mixers (closed mixing machines), such as Banbury mixer, kneader, planetary mixer and intermixer, or blending devices, such as two-roll mill and three-roll mill, the copolymer [A] and the organopolysiloxane [B] are blended together with other components, such as rubber reinforcing agent, inorganic filler and softener, at a temperature of preferably 50 to 180° C. for 3 to 10 minutes, then by the use of rolls, such as open roll, or a kneader, the SiH group-containing compound [C], and if necessary, the below-described catalyst, reaction inhibitor, vulcanizing accelerator and crosslinking assistant are added and blended at a roll temperature of not higher than 100° C. for 1 to 30 minutes, and thereafter the blend is rolled, whereby the rubber composition of the invention can be prepared.

When the blending temperature in the internal mixers is low, an anti-aging agent, a colorant, a dispersant, a flame retardant, etc. may be simultaneously blended together with the copolymer [A], the organopolysiloxane [B], the SiH group-containing compound [C], the rubber reinforcing agent, the inorganic filler, the softener and the like.

Crosslinking Method

Catalyst

In the case where crosslinking is carried out by the use of the SiH group-containing compound [C] in the preparation of the rubber composition of the invention, the catalyst used for the crosslinking is an addition reaction catalyst and accelerates addition reaction (e.g., hydrosilylation reaction of alkene) of the alkenyl group or the like of the copolymer [A] and/or the alkenyl group or the like of the organopolysiloxane [B] with the SiH group of the SiH group-containing compound [C].

As the catalyst, an addition reaction catalyst comprising a platinum group element, such as platinum-based catalyst, palladium-based catalyst or rhodium-based catalyst, is usually used, and in the present invention, a platinum-based catalyst is preferable. It is desirable to use a complex of a periodic table group 8 element metal (including the platinum-based catalyst), particularly preferably platinum, and a compound containing a vinyl group and/or a carbonyl group.

The compound containing a carbonyl group is preferably carbonyl, octanal or the like. Examples of the complexes of such compounds and platinum include a platinum-carbonyl complex, a platinum-octanal complex, a platinum-carbonylbutylcyclosiloxane complex and a platinum-carbonylpheylcyclosiloxane complex.

The compound containing a vinyl group is preferably a vinyl group-containing organosiloxane. Examples of the complexes of such compounds and platinum include a platinum-divinyltetramethyldisiloxane complex, a platinum-divinyltetraethyldisiloxane complex, a platinum-divinyltetrapropyldisiloxane complex, a platinum-divinyltetrabutyldisiloxane complex and a platinum-divinyltetraphenyldisiloxane complex.

Of the vinyl group-containing organosiloxanes, a vinyl group-containing cyclic organosiloxane is preferable. Examples of the complexes of such compounds and platinum include a platinum-vinylmethylcyclosiloxane complex, a platinum-vinylethylcyclosiloxane complex and a platinum-vinylpropylcyclosiloxane complex.

Although the vinyl group-containing organosiloxane may be used as it is as a ligand to a metal, it may be used as a solvent for coordinating other ligands. A complex using the vinyl group-containing organosiloxane as a solvent and containing, as a ligand, the aforesaid compound containing a carbonyl group is particularly preferable as a catalyst.

Examples of such complexes include a vinylmethylcyclosiloxane solution of a platinum-carbonyl complex, a vinylethylcyclosiloxane solution of a platinum-carbonyl complex, a vinylpropylcyclosiloxane solution of a platinum-carbonyl complex, a divinyltetramethyldisiloxane solution of a platinum-carbonyl complex, a divinyltetraethyldisiloxane solution of a platinum-carbonyl complex, a divinyltetrapropyldisiloxane solution of a platinum-carbonyl complex, a divinyltetrabutyldisiloxane solution of a platinum-carbonyl complex, and a divinyltetraphenyldisiloxane solution of a platinum-carbonyl complex.

The catalysts comprising these complexes may further contain components other than the compound containing a vinyl group and/or a carbonyl group. For example, a solvent other than the compound containing a vinyl group and/or a carbonyl group may be contained. Examples of such solvents include various alcohols and xylene, but the solvents employable herein are not limited to them.

Examples of the alcohols include aliphatic saturated alcohols, such as methanol and ethanol; aliphatic unsaturated alcohols, such as allyl alcohol and crotyl alcohol; alicyclic alcohols, such as cyclopentanol and cyclohexanol; aromatic alcohols, such as benzyl alcohol and cinnamyl alcohol; and heterocyclic alcohols, such as furfuryl alcohol.

An example of the catalyst using an alcohol as a solvent is a platinum-octanal/octanol complex. When such a solvent is contained, an advantage that handling of the catalyst or mixing of the catalyst with the rubber composition is facilitated.

Of the above-mentioned various catalysts, a vinylmethylcyclosiloxane solution of a platinum-carbonyl complex (particularly, a complex represented by the following chemical formula 1 is preferable), a platinum-vinylmethylcyclosiloxane complex (particularly, a complex represented by the following chemical formula 2 is preferable), a platinum-divinyltetramethyldisiloxane complex (particularly, a complex represented by the following chemical formula 3 is preferable), a platinum-octanal/octanol complex, etc. are preferable from the viewpoint of practical use. Of these, a platinum-carbonylvinylmethylcyclosiloxane complex is particularly preferable.

  Chemical formula 1

$Pt^0 \cdot CO \cdot (CH_2=CH(Me)SiO)_4$    Chemical formula 1

$Pt^0 \cdot (CH_2=CH(Me)SiO)_4$    Chemical formula 2

$Pt^0 \cdot 1.5[(CH_2=CH(Me)_2Si)_2O]$    Chemical formula 3

The proportion of the periodic table group 8 element metal (preferably platinum) contained in these catalysts is in the range of usually 0.1 to 10% by weight, preferably 1 to 5% by weight, more preferably 2 to 4% by weight, particularly preferably 2.5 to 3.5% by weight.

The catalyst is used in a proportion of 0.1 to 100,000 ppm by weight, preferably 0.1 to 10,000 ppm by weight, more preferably 1 to 5,000 ppm by weight, particularly preferably 5 to 1,000 ppm by weight, based on the total ([A]+[B]) of the copolymer [A] and the organopolysiloxane [B]. When the catalyst is used in a proportion in the above range, a rubber composition capable of producing a crosslinked rubber molding having moderate crosslink density and having excellent strength properties and elongation properties is obtained. Use of the catalyst in a proportion exceeding 100,000 ppm by weight is undesirable because of disadvantageous cost. By irradiating an uncrosslinked rubber molding of a rubber composition containing no catalyst with light, γ-rays, electron rays or the like, a crosslinked rubber molding can be also obtained.

In the crosslinking of the rubber composition of the invention, addition crosslinking and radical crosslinking may be both carried out by the use of an organic peroxide in addition to the above catalyst. The organic peroxide is used in a proportion of about 0.1 to 10 parts by weight based on 100 parts by weight of the total ([A]+[B]) of the copolymer [A] and the organopolysiloxane [B]. As the organic peroxide, a hitherto publicly known organic peroxide that is usually used for crosslinking of rubbers can be employed.

Reaction Inhibitor

In the crosslinking, a reaction inhibitor is preferably used together with the above catalyst. Examples of the reaction inhibitors include benzotriazole, ethynyl group-containing alcohols, such as ethynylcyclohexanol, acrylonitrile, amide compounds, such as N,N-diallylacetamide, N,N-diallylbenzamide, N,N,N',N'-tetraallyl-o-phthalic acid diamide, N,N,N',N'-tetraallyl-m-phthalic acid diamide and N,N,N',N'-tetraallyl-p-phthalic acid diamide, sulfur, phosphorus, nitrogen, amine compounds, sulfur compounds, phosphorus compounds, tin, tin compounds, tetramethyltetravinylcyclotetrasiloxane, and organic peroxides, such as hydroperoxide.

The reaction inhibitor is used in a proportion of 0 to 50 parts by weight, usually 0.0001 to 50 parts by weight, preferably 0.0001 to 30 parts by weight, more preferably 0.0001 to 20 parts by weight, still more preferably 0.0001 to 10 parts by weight, particularly preferably 0.0001 to 5 parts by weight, based on 100 parts by weight of the total ([A]+[B]) of the copolymer [A] and the organopolysiloxane [B]. Use of the reaction inhibitor in a proportion exceeding 50 parts by weight is undesirable because of disadvantageous cost.

Other Components

To the rubber composition of the invention, hitherto publicly known additives, such as rubber reinforcing agent, inorganic filler, softener, anti-aging agent, processing aid, vulcanizing accelerator, organic peroxide, crosslinking assistant, foaming agent, foaming assistant, colorant, dispersant and flame retardant, can be added according to the use application of the intended crosslinked product, within limits not detrimental to the objects of the present invention. Typical examples of fillers and additives are specifically described below.

(i) Rubber Reinforcing Agent

The rubber reinforcing agent contributes to enhancing mechanical properties of a crosslinked (vulcanized) rubber, such as tensile strength, tear strength and abrasion resistance. Examples of such rubber reinforcing agents include carbon black, such as SRF, GPF, FEF, HAF, ISAF, SAF, FT and MT, carbon black obtained by surface-treating these carbon black with silane coupling agents, finely divided silicic acid, and silica.

In the present invention, a rubber composition capable of providing a sealing member having excellent strength and excellent sealing properties can be obtained even if use of carbon black is omitted, but by the addition of carbon black, further improved strength is obtained. When the carbon black is used, the amount of the carbon black is desired to be in the range of 1 to 300 parts by weight, preferably 1 to 200 parts by weight, more preferably 1 to 100 parts by weight, particularly preferably 1 to 50 parts by weight, most preferably 10 to 50 parts by weight, based on 100 parts by weight of the total ([A]+[B]) of the copolymer [A] and the organopolysiloxane [B]. In the composition of the invention, favorable electrical insulation properties can be maintained even if carbon black is added.

Examples of silica include fumed silica and precipitated silica. These silica may be those having been surface-treated with reactive silanes, such as hexamethyldisilazane, chlorosilane and alkoxysilane, low-molecular weight siloxane, or the like. The specific surface area (BET method) of such silica is preferably not less than 10 m$^2$/g, more preferably 30 to 500 m$^2$/g.

Although the type and the amount of the rubber reinforcing agent can be properly selected according to the use application, the amount of the rubber reinforcing agent added is usually at most 300 parts by weight, preferably at most 200 parts by weight, based on 100 parts by weight of the total ([A]+[B]) of the ethylene/α-olefin/non-conjugated polyene copolymer [A] and the organopolysiloxane [B]. The above rubber reinforcing agents can be used singly or in combination of two or more kinds.

(ii) Inorganic Filler

Examples of the inorganic fillers include light calcium carbonate, heavy calcium carbonate, talc, clay and diatomaceous earth. These inorganic fillers can be used singly or in combination of two or more kinds. Although the type and the amount of the inorganic filler can be properly selected according to the use application, the amount of the inorganic filler added is not less than 1 part by weight and at most 300 parts by weight, preferably at most 200 parts by weight, based on 100 parts by weight of the total ([A]+[B]) of the copolymer [A] and the organopolysiloxane [B].

(iii) Softener

As the softener, a publicly known softener that is usually used for rubbers is employable. Examples of the softeners include petroleum type softeners, such as process oil, lubricating oil, paraffin, liquid paraffin, petroleum asphalt and vaseline; coal tar type softeners, such as coal tar and coal tar pitch; fatty oil type softeners, such as castor oil, linseed oil, rapeseed oil and coconut oil; waxes, such as beeswax, carnauba wax and lanolin; fatty acids and fatty acid salts, such as ricinolic acid, palmitic acid, barium stearate, calcium stearate and zinc laurate; synthetic high-molecular substances, such as petroleum resin, atactic polypropylene and coumaroneindene resin; and other softeners, such as tall oil and factice. Of these, petroleum type softeners are preferably used, and process oil is particularly preferably used. The amount of the softener added is properly selected according to the use application of the crosslinked product. The above softeners can be used singly or in combination of two or more kinds.

(iv) Anti-Aging Agent

As the anti-aging agent, any of hitherto publicly known anti-aging agents is employable, and examples thereof include anti-aging agents of amine type, hindered phenol type and sulfur type. The anti-aging agent is used in an amount not detrimental to the objects of the present invention. The anti-aging agents illustrated below can be used singly or in combination of two or more kinds even in those of the same types or different types of the amine type, the hindered amine type and the sulfur type.

Examples of the amine type anti-aging agents include diphenylamines and phenylenediamines. In particular, 4,4'-(α,α-dimethylbenzyl)diphenylamine and N,N'-di-2-naphtnyl-p-phenylenediamine are preferable.

As the hindered phenol type anti-aging agents, phenol compounds, such as tetrakis[methylene-3-(3',5'-di-t-butyl-4'-hydroxyphenyl)propionate]methane and 3,9-bis[2-{3-(3-t-butyl-4-hydroxy-5-methylphenyl)propionyloxy}-1,1-dimethylethyl]-2,4,8,10-tetraoxaspiro[5,5]undecane, are particularly preferable.

As the sulfur type anti-aging agents, 2-mercaptobenzimidazole, zinc salt of 2-mercarptobenzimidazol, 2-mercaptomethylbenzimidazole, zinc salt of 2-mercarptomethylbenzimidazol and pentarythritol-tetrakis-(β-laurylthiopropionate) are particularly preferable.

(v) Processing Aid

As the processing aid, a publicly known compound that is used for processing usual rubbers is employable. Examples of such processing aids include higher fatty acids, such as ricinolic acid, stearic acid, palmitic acid and lauric acid; salts of higher fatty acids, such as barium stearate, zinc stearate and calcium stearate; and esters of higher fatty acids such as ricinolic acid, stearic acid, palmitic acid and lauric acid. The processing aid is used in an amount of not more than 10 parts by weight, preferably not more than 5 parts by weight, based on 100 parts by weight of the total ([A]+[B]) of the copolymer [A] and the organopolysiloxane [B], but it is desirable to properly determine the optimum amount according to the property values required.

(vi) Crosslinking Assistant

In the case where an organic peroxide is used in the crosslinking of the rubber composition of the invention, it is preferable to use a crosslinking assistant in combination.

Examples of the crosslinking assistants include sulfur, quinonedioxime compounds, such as p-quinonedioxime, methacrylate compounds, such as polyethylene glycol dimethacrylate, allyl compounds, such as diallyl phthalate and triallyl cyanurate, maleimide compounds, and divinylbenzene. Such a crosslinking assistant is used in an amount of 0.5 to 2 mol, preferably about equimolar amount, based on 1 mol of the organic peroxide used.

(vii) Other Rubbers

In the rubber composition of the invention, other rubbers publicly known can be used in combination, within limits not detrimental to the objects of the present invention. Examples of such rubbers include natural rubber (NR), isoprene-based rubbers, such as isoprene rubber (IR), and conjugated diene-based rubbers, such as butadiene rubber (BR), styrene-butadiene rubber (SBR), acrylonitrile-butadiene rubber (NBR) and chloroprene rubber (CR).

Further, hitherto publicly known ethylene/α-olefin copolymer rubbers, such as ethylene/propylene random copolymer (EPR), and ethylene/α-olefin/non-conjugated polyene copolymers other than the copolymer [A] for the invention, such as ethylene/propylene/non-conjugated diene copolymer (EPDM), are employable.

Fuel Cell Sealing Member, Hard Disc Drive Top Cover Gasket, Electric Wire Connector Sealing Member Molding Method The rubber composition of the invention is excellent not only in mechanical properties but also in heat resistance, and therefore, it can be favorably used for fuel cell sealing members, hard disc drive top cover gaskets and electric wire connector sealing members.

The fuel cell sealing member, the hard disc drive top cover gasket and the electric wire connector sealing member of the invention (referred to as the "respective members of the invention" hereinafter) can exhibit their properties most prominently when they are used as crosslinked rubber moldings.

For producing the crosslinked rubber moldings from the rubber composition of the invention, an uncrosslinked rubber composition is temporarily prepared by the process described above, then the rubber composition is molded into intended shapes, and the resulting moldings are crosslinked, similarly to the case where general rubbers are usually vulcanized (crosslinked).

The composition of the invention prepared as above is molded into intended shapes by various molding methods using LIM molding machine, injection molding machine, transfer molding machine, press molding machine, extrusion molding machine, calender roll and the like. Of these, the LIM molding machine is preferably used for producing the desired respective members of the invention from the viewpoints of thickness accuracy and high-speed molding. Injection molding and compression molding are also preferable.

Crosslinking

Crosslinking can be carried out simultaneously with molding the composition, or can be carried out by introducing the resulting molding into a vulcanizing bath. The molding is heated under the vulcanization conditions of a temperature of 50 to 270° C. for 0.5 to 60 minutes. If necessary, secondary vulcanization wherein the molding is further heated at about 120 to 200° C. for about 1 to 24 hours is carried out. It is also possible to irradiate the molding with light, γ-rays, electron rays or the like to cure it. Through the above method, crosslinked rubber moldings, namely, the respective members of the invention, are obtained. The crosslinking may also be carried out at ordinary temperature.

In this crosslinking stage, a mold may be used, or the crosslinking may be carried out without using a mold. In the case where a mold is not used, molding and crosslinking are usually carried out continuously. As heating means in the vulcanizing bath, a heating bath using hot air, glass-bead fluidized bed, UHF (ultrahigh frequency electromagnetic wave), steam or the like is employable.

LIM Molding

In the case where the rubber composition of the invention is applied particularly to LIM molding, it is desirable to prepare liquid rubber compositions in which the SiH group-containing compound [C] and the catalyst are separately contained.

That is to say, by means of a stirring machine, e.g., an internal mixer (closed mixing machine) such as Banbury mixer, kneader or intermixer, or a planetary mixer, the copolymer [A], the organopolysiloxane [B], additives, such as rubber reinforcing agent, inorganic filler and softener, and the SiH group-containing compound [C] are blended for 3 to 10 minutes to prepare a liquid rubber composition (1). Separately, the copolymer [A], the organopolysiloxane [B], additives, such as rubber reinforcing agent, inorganic filler and softener, the catalyst, and if necessary, a reaction inhibitor are blended for 3 to 10 minutes to prepare a liquid rubber composition (2). Defoaming is carried out, when needed. Subsequently, the liquid rubber composition (1) and the liquid rubber composition (2) are placed in an exclusive pail can capable of being directly connected to a LIM molding apparatus or a cartridge capable of being directly connected to a LIM molding apparatus, then metering and mixing using a mixing apparatus are carried out, and the mixture is subjected to LIM molding, whereby the respective members of the invention can be obtained.

Fuel Cell Sealing Member

For fuel cells, sealing of a cell is important, and the seal needs to be excellent particularly in gas barrier properties. One example of the shape of the seal is described with reference to the drawings.

Figure 2:
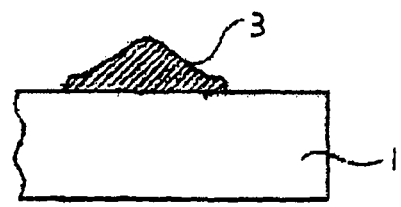
FIG. 2 is a schematic sectional view taken on line A-A of FIG. 1.

The sealing member has, for example, such a shape as designated by numeral 3 in FIG. 1 and FIG. 2. This sealing member has such a planar external shape as designated by numeral 3 in FIG. 1. In FIG. 1 and FIG. 2, numeral 1 designates a metal or resin separator, and numeral 3 designates a sealing member. In FIG. 2, numeral 2 designates an air space.

The fuel cell sealing member of the invention preferably has no void caused by foaming or the like, that is, the sealing member is preferably so-called void-free.

The fuel cell sealing member of the invention desirably has a volume intrinsic resistivity of not less than $1 \times 10^{10}$ Ω·cm. The volume intrinsic resistivity is one of properties required for sealing members used in electrical or electronic parts, and is an indication of electrical insulation properties. The volume intrinsic resistivity is more preferably not less than $1 \times 10^{12}$ Ω·cm, and the sealing member having such a volume intrinsic resistivity exhibits favorable performance as a sealing member. The volume intrinsic resistivity is measured using a sheet of 1 mm thickness obtained by press-crosslinking the rubber composition at a pressure of 40 kgf/cm² and a temperature of 150° C. for 10 minutes in accordance with SRIS2301-1969.

The fuel cell of the invention has such a fuel cell sealing member of the invention.

Hard Disc Drive Top Cover Gasket

The hard disc drive top cover gasket of the invention preferably has, at the gasket portion, a crosslinked rubber sheet obtained by the aforesaid process and having a compression set of not more than 50%, whereby the resulting manufactured article exhibits sufficient sealing properties. The crosslinked rubber sheet preferably has a tensile strength of not less than 2 MPa and a tensile elongation at break of not less than 200%, whereby a trouble that the rubber sheet is easily torn off in the production process rarely occurs. Further, the crosslinked rubber sheet preferably has a hardness (JIS K6253) of less than 70 degrees. If the hardness is not less than 70 degrees, the counterforce given when the cover-integrated gasket is mounted on the main body is increased. As a result, the cover is deformed and cannot be shut completely, and thus, the sealing properties required for a gasket are sometimes deteriorated. The hardness is preferably not less than 10 degrees, and if the hardness is less than 10 degrees, a trouble that the gasket is easily torn off or easily adheres takes place. The hardness is most preferably 20 to 40 degrees.

Examples of adhesives used for uniting the hard disc drive top cover and the gasket in one include epoxy resin adhesives, phenol resin adhesives, isocyanate-based coupling agents and silane-based coupling agents. For applying the adhesive, an optimum method, e.g., dipping, spraying, screen printing, brushing or stamping, is selected according to necessity.

The hard disc drive top cover gasket of the invention preferably has no void caused by foaming or the like, that is, the gasket is preferably so-called void-free.

Electric Wire Connector Sealing Member

The electric wire connector sealing member of the invention comprises the aforesaid rubber composition of the invention and is preferably, for example, a solid high-molecular type (solid polyelectrolyte type) electric wire connector sealing member.

The electric wire connector sealing member of the invention preferably has a durometer A hardness, which indicates surface hardness of the cured product layer, of not more than 45. The durometer A hardness is an indication of hardness and can be measured in accordance with JIS K6253. A durometer A hardness of not more than 45 can be obtained by variously controlling proportions of various additives added to the composition, such as reinforcing agent, filler and plasticizer. An electric wire connector seal of a rubber composition containing none of these various additives also exhibits a desired low hardness. The lower limit of the hardness is not less than 5, and if the hardness is less than the lower limit, the sealing member is too soft and is inferior in ability to seal the electric wire connector. However, an electric wire connector seal containing, as reinforcing agents or fillers, substances that become catalyst poisons, such as sulfur and halogen compounds, is undesirable.

The electric wire connector of the invention has such an electric wire connector seal of the invention.

The present invention is further described with reference to the following examples, but it should be construed that the invention is in no way limited to those examples.

Composition, iodine value and intrinsic viscosity [η] of the copolymer [A] were determined by the following measurement and calculation.

(1) Composition

The composition of the copolymer [A] was measured by $^{13}$C-NMR method.

(2) Iodine Value

The iodine value was determined by titration.

(3) Intrinsic Viscosity [η]

The intrinsic viscosity [η] was measured in decalin at 135° C.

PREPARATION EXAMPLE 1

Preparation of Ethylene/Propylene/5-vinyl-2-norbornene Random Copolymer [A-1]

In a stainless steel polymerizer (stirring rotational speed: 250 rpm) having a substantial internal volume of 100 liters and equipped with a stirring blade, terpolymerization of ethylene, propylene and 5-vinyl-2-norbornene (abbreviated to "VNB" hereinafter) was continuously carried out. From the side of the polymerizer, to the liquid phase were continuously fed hexane at a rate of 60 l/hr, ethylene at a rate of 1.3 kg/hr, propylene at a rate of 2.5 kg/hr, VNB at a rate of 130 g/hr, hydrogen at a rate of 30 l/hr, VO(OEt)Cl$_2$ as a catalyst at a rate of 23 mmol/hr and Al(ET)$_{1.5}$Cl$_{1.5}$ as a catalyst at a rate of 161 mmol/hr. Under the conditions described above and in Table 1, copolymerization reaction was carried out to obtain an ethylene/propylene/VNB random copolymer [A-1] (abbreviated to "copolymer [A-1]" hereinafter) in the form of a homogenous solution. Thereafter, to the polymer solution continuously drawn out from the bottom of the polymerizer, a small amount of methanol was added to terminate the polymerization reaction. The polymer was separated from the solvent by steam stripping and then vacuum dried at 55° C. for 48 hours.

Properties of the resulting copolymer [A-1] are shown in Table 1.

TABLE 1

|  | Copolymer A-1 |
| --- | --- |
| Production conditions |  |
| Catalyst | VO(OEt)Cl$_2$ |
| Co-catalyst | Al(Et)$_{1.5}$Cl$_{1.5}$ |
| Al/V (molar ratio) | 7 |
| Polymerization temperature (° C.) | 40 |
| Polymerization pressure (MPa) | 0.7 |
| Catalyst feed rate (mmol/hr) | 23 |
| Polyene | VNB |
| VNB feed rate (g/hr) | 130 |
| α-Olefin | propylene |
| Ethylene/α-olefin feed rate (kg/hr) | 1.3/2.5 |
| H$_2$ (NL/hr) | 30 |
| Evaluation results |  |
| Polymer concentration (g/L) | 50 |
| Yield (kg/hr) | 2 |
| Ethylene content (wt %) | 53 |
| α-Olefin content (wt %) | 42 |
| VNB content (wt %) | 5 |
| Intrinsic viscosity [η] (dl/g) | 0.28 |
| Iodine value (g/100 g) | 9.5 |

VNB: 5-vinyl-2-norbornene

SiH Group-Containing Compound

In the following examples and comparative examples, compounds represented by the following formulas were used as the SiH group-containing compounds.

[C-1] 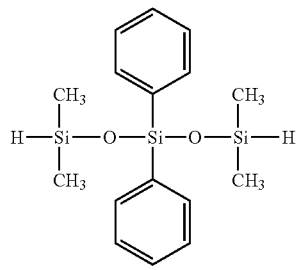

[C-2] 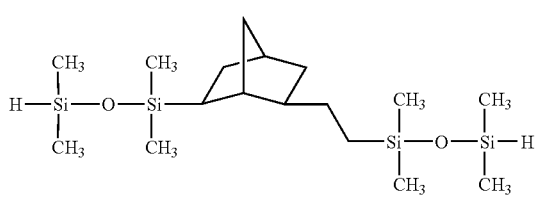

[C-3] 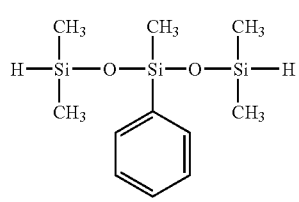

[C-4] 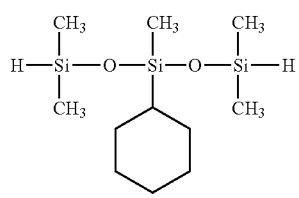

[C-5] 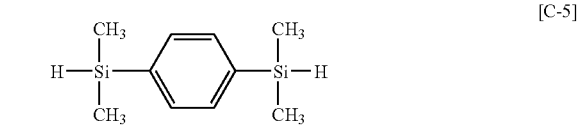

[C-6] 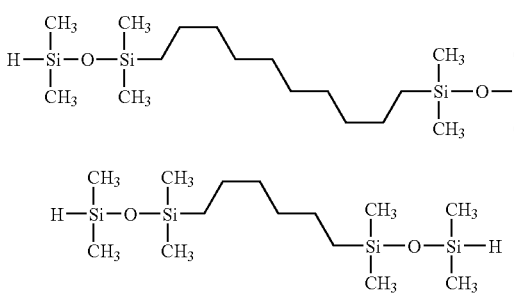

[C-7]

[C-8] 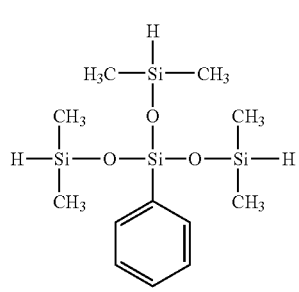

EXAMPLE 1

First, in a 2-liter planetary mixer (manufactured by Inoue Manufacturing Co., Ltd., trade name: PLM-2 model), 100 parts by weight of the copolymer [A-1] shown in Table 1, 15 parts by weight of carbon black (available from Asahi Carbon Co., Ltd., trade name: F-200), 20 parts by weight of talc (available from Takehara Kagaku Kogyo Co., Ltd., trade name: Highmicron HE-5) and 20 parts by weight of silica (available from Tatsumori Ltd., trade name: Crystalite) were blended to obtain a blend.

Subsequently, to 160 parts by weight of the blend, 5 parts by weight of the above-mentioned SiH group-containing compound [C-1] (crosslinking agent), 0.1 part by weight of ethynylcyclohexanol as a reaction inhibitor and 0.4 part by weight of a platinum-1,3,5,7-tetravinylmethylcyclosiloxane complex (platinum concentration: 0.5% by weight, terminal vinylsiloxane oil solution) were added, and they were milled 7 times by means of three rolls having a diameter of 3 inches (manufactured by Kodaira Seisakusho Co., Ltd., trade name: Three-roll mill), and then a pressure was applied at 150° C. for 10 minutes by the use of a 50-ton press-molding machine to obtain a crosslinked rubber sheet having a thickness of 2 mm. Properties of the resulting crosslinked rubber sheet were measured or evaluated in the following manner. The results are set forth in Table 2.

(1) Tensile Test

A tensile test was carried out under the conditions of a measuring temperature of 23° C. and a tensile rate of 500 mm/min in accordance with JIS K6251, and when the crosslinked sheet was broken, a tensile strength TB and an elongation EB were measured. Further, a tensile product at break [tensile strength TB×elongation EB] was determined.

(2) Compression Set

The 2-mm sheet was laminated, and a compression set was measured in accordance with JIS K6262 (1997). The measurement was carried out under the measuring conditions of 150° C.×72 hours.

(3) Acid Resistance

An immersion test in an acid solution (hydrochloric acid solution having hydrochloric acid concentration of 35% by weight) was carried out in accordance with JIS K6258 (immersion conditions: 25° C., 168 hours). Thereafter, tensile elongation, strength and rate of change in volume were measured, and rates of changes in these properties (hardness: value of change) were determined.

(4) Volume Intrinsic Resistivity

The composition having been milled 7 times by means of three rolls as above was press-crosslinked at a pressure of 40 kgf/cm$^2$ and a temperature of 150° C. for 10 minutes, and a volume intrinsic resistivity of the resulting sheet having a thickness of 1 mm was measured in accordance with JIS K6271.

A sheet having a volume intrinsic resistivity of not less than $1 \times 10^{10}$ Ω·cm, preferably not less than $1 \times 10^{12}$ Ω·cm, is desirable because the sheet exhibits favorable performance as an electrical or electronic part sealing member.

TABLE 2

|  | Ex. 1 | Ex. 2 | Ex. 3 | Ex. 4 | Ex. 5 | Ex. 6 | Ex. 7 | Comp. Ex. 1 |
| --- | --- | --- | --- | --- | --- | --- | --- | --- |
| Blending |  |  |  |  |  |  |  |  |
| Copolymer A-1 | 100 | 100 | 100 | 100 | 100 | 100 | 100 | 100 |
| Carbon black (available from Asahi Carbon Co., Ltd., trade name: F-200) | 15 | 15 | 15 | 15 | 15 | 15 | 15 | 15 |
| Talc (available from Takehara Kagaku Kogyo Co., Ltd., trade name: Highmicron HE-5) | 20 | 20 | 20 | 20 | 20 | 20 | 20 | 20 |
| Silica (available from Tatsumori Ltd., trade name: Crystalite) | 20 | 20 | 20 | 20 | 20 | 20 | 20 | 20 |
| SiH group-containing compound [C-1] | 5 |  |  |  |  |  |  |  |
| SiH group-containing compound [C-2] |  | 7.9 |  |  |  |  |  |  |
| SiH group-containing compound [C-3] |  |  | 5.5 |  |  |  |  |  |
| SiH group-containing compound [C-4] |  |  |  | 5.7 |  |  |  |  |
| SiH group-containing compound [C-5] |  |  |  |  | 4 |  |  |  |
| SiH group-containing compound [C-6] |  |  |  |  |  | 8.3 |  |  |
| SiH group-containing compound [C-7] |  |  |  |  |  |  | 7.2 |  |
| SiH group-containing compound [C-8] |  |  |  |  |  |  |  | 4.5 |
| Platinum-1,3,5,7-tetravinylmethylcyclosiloxane complex | 0.4 | 0.4 | 0.4 | 0.4 | 0.4 | 0.4 | 0.4 | 0.4 |
| 1-Ethynyl-1-cyclohexanol | 0.1 | 0.1 | 0.1 | 0.1 | 0.1 | 0.1 | 0.1 | 0.1 |
| Crosslinked rubber properties |  |  |  |  |  |  |  |  |
| Strength properties |  |  |  |  |  |  |  |  |
| Tensile strength at break (MPa) [S] | 3 | 3.2 | 3 | 2.8 | 2.5 | 2.8 | 2.9 | 3.3 |
| Tensile elongation at break (%) [E] | 500 | 430 | 420 | 450 | 500 | 450 | 440 | 220 |
| [S × E] | 1500 | 1376 | 1260 | 1260 | 1250 | 1260 | 1278 | 726 |
| Sealing properties, Compression set (150° C. × 72 hrs) (%) | 20 | 23 | 23 | 27 | 29 | 27 | 26 | 60 |
| Acid resistance (solution of hydrochloric acid concentration of 35 wt %) |  |  |  |  |  |  |  |  |
| Retention of strength (%) | 102 | 102 | 104 | 104 | 108 | 105 | 105 | 102 |
| Retention of elongation (%) | 100 | 100 | 99 | 99 | 98 | 99 | 99 | 95 |
| Volume intrinsic resistivity (Ω · cm) | $10^{14}$ | $10^{14}$ | $10^{14}$ | $10^{14}$ | $10^{14}$ | $10^{14}$ | $10^{14}$ | $10^{14}$ |

EXAMPLES 2 TO 7

Sheets were obtained in the same manner as in Example 1, except that the aforesaid SiH group-containing compounds [C-2] to [C-7] were each used instead of 5 parts by weight of the SiH group-containing compound [C-1] used in Example 1. The evaluation results of the sheets are set forth in Table 2, together with the SiH group-containing compounds used and their quantities.

COMPARATIVE EXAMPLE 1

A sheet was obtained in the same manner as in Example 1, except that 4.5 parts by weight of the aforesaid SiH group-containing compound [C-8] was used instead of 5 parts by weight of the SiH group-containing compound [C-1] used in Example 1. The evaluation results of the sheet are set forth in Table 2.

Comments On Examples 2 To 7 and Comparative Example 1

A fuel cell sealing member has a function of sealing a reaction gas. If the fuel cell sealing member is deformed and broken by an external force or the like, the reaction gas leaks outside and is dangerous. Therefore, it is necessary that the sealing member should not be broken by an external force. On the other hand, lowering of sealing performance brings about a risk of leakage of a reaction gas, so that high sealing performance is required.

The numerical value of "tensile strength at break [S]× tensile elongation at break [E]" described in Table 2 indicates energy required for breaking a sealing member. In Examples 1 to 7, this value was larger than that in Comparative Example 1, and it has been proved that the rubber sheets in Examples 1 to 7 need greater energy in order to break them and are hardly broken by an external force. Further, the rubber sheets in Examples 1 to 7 have proved to be excellent also in compression set.

EXAMPLE 8

In a 2-liter planetary mixer (manufactured by Inoue Manufacturing Co., Ltd., trade name: PLM-2 model), 100 parts by weight of the copolymer [A-1], 15 parts by weight of carbon black (available from Asahi Carbon Co., Ltd., trade name: F-200) and 35 parts by weight of talc (available from Takehara Kagaku Kogyo Co., Ltd., trade name: Highmicron HE-5) were blended to obtain a blend.

To 150 parts by weight of the blend, 5 parts by weight of the aforesaid SiH group-containing compound [C-1] (crosslinking agent), 0.1 part by weight of ethynylcyclohexanol as a reaction inhibitor and 0.4 part by weight of a platinum-1,3,5, 7-tetravinylmethylcyclosiloxane complex (platinum concentration: 0.5% by weight, terminal vinylsiloxane oil solution) were added, and they were milled 7 times by means of three rolls having a diameter of 3 inches (manufactured by Kodaira Seisakusho Co., Ltd., trade name: Three-roll mill), and then a pressure was applied at 150° C. for 10 minutes by the use of a 50-ton press-molding machine to prepare a crosslinked rubber sheet having a thickness of 2 mm.

The resulting crosslinked rubber sheet was subjected to a hardness test, a compression set test and a tensile test in accordance with the following methods. The results are set forth in Table 3.

(1) Hardness Test

Three crosslinked rubber sheets for test each having a thickness of 2 mm were superposed one upon another, and a hardness test was carried out in accordance with JIS K6253 to measure a hardness.

(2) Compression Set Test

A compression set test was carried out in accordance with JIS K6262. That is to say, the crosslinked rubber sheet for test having a thickness of 2 mm was heat-treated at 120° C. for 168 hours and then evaluated on its compression set. A crosslinked rubber sheet having a compression set of not less than 50% has insufficient sealing properties as a manufactured article and is undesirable as a gasket for a top cover of a hard disc drive.

(3) Tensile Test

A tensile test was carried out in accordance with JIS K6251 to determine a tensile strength TB and a tensile elongation at break EB. A sheet having a value of "tensile strength×EB" of less than 1000 is easily torn off in the production process and is undesirable as a gasket for a top cover of a hard disc drive.

Samples for leakage test, bonding property test and moldability test were prepared and evaluated in the following manner. The results are set forth in Table 3.

Preparation of Test Sample

A metallic part obtained by applying an adhesive (silane-based adhesive, available from Road Far East Co., trade name: AP-133) to an aluminum plate (on which a nickel film having a thickness of 2 to 5 μm had been formed by electroless nickel plating) having been shaped into a cover shape in advance was inserted into a mold, and using a liquid injection molding machine, a gasket was molded integrally with the hard disc drive top cover under the conditions of a cylinder present temperature of 50 to 80° C., an injection rate of 0.5 second, an injection pressure of 100 MPa, a mold temperature of 200° C. and a cycle time of 300 seconds. Thus, a cover-integrated gasket was obtained. The resulting cover-integrated gasket was subjected the following tests.

(4) Leakage Test

The gasket integrally molded with the cover was set on a real system leakage test machine, and in this state, the gasket was heat-treated at 10° C. for 3000 hours. Thereafter, the temperature was returned to room temperature, and from the interior of the test machine, a positive pressure of 5 kPa was continuously applied to the gasket for 30 seconds. After 15 seconds, occurrence of leakage was examined. The evaluation criteria of this test are as follows. A gasket causing no leakage was regarded as "pass" (represented by "○"), and a gasket causing leakage was regarded as "failure" (represented by "x"). When a gasket material has poor compression set properties or a gasket has a defective shape, leakage occurs.

(5) Bonding Property Test

On the bonded surface of the gasket integrated with the cover, a penetrated peeling of about 1 mm was made. Through this portion, a SUS wire was passed, and a normal tensile load was applied. When the penetrated peeling was enlarged to about 10 mm, the load (peel load) applied was measured. The evaluation criteria of this test are as follows. A gasket having a peel load of not less than 100 kPa was regarded as "pass" (represented by "○"), and a gasket having a peel load of less than 100 kPa was regarded as "failure" (represented by "x"). A gasket having a peel load of not less than 100 kPa exhibits sufficient bond strength even in the actual use environment.

(6) Moldability Test

A gasket having no trouble in the injection molding for preparing a moldability test sample was regarded as "pass" (represented by "○"), and a gasket having a trouble in said injection molding was regarded as "failure" (represented by "x"). The trouble means that molding into a desired article shape is impossible, that is, deformation, sink mark, chipping, welding, short shot, mold flashing or the like occurs, or a phenomenon that a gasket cannot be integrally molded with a cover takes place.

EXAMPLE 9

A crosslinked rubber sheet was obtained in the same manner as in Example 8, except that 7.9 parts by weight of the SiH group-containing compound [C-2] was used instead of 5 parts by weight of the SiH group-containing compound [C-1] used in Example 8. Then, evaluation of the rubber sheet was carried out. The results are set forth in Table 3.

COMPARATIVE EXAMPLE 2

A crosslinked rubber sheet was obtained in the same manner as in Example 8, except that 4.5 parts by weight of the SiH group-containing compound [C-8] was used instead of 5 parts by weight of the SiH group-containing compound [C-1] used in Example 8. Then, evaluation of the rubber sheet was carried out. The results are set forth in Table 3.

TABLE 3

| | Ex. 8 | Ex. 9 | Comp. Ex. 2 |
|---|---|---|---|
| Blending | | | |
| Copolymer A-1 | 100 | 100 | 100 |
| Carbon black (available from Asahi Carbon Co., Ltd., trade name: F-200) | 15 | 15 | 15 |
| Talc (available from Takehara Kagaku Kogyo Co., Ltd., trade name: Highmicron HE-5) | 35 | 35 | 35 |
| SiH group-containing compound [C-1] | 5 | | |
| SiH group-containing compound [C-2] | | 7.9 | |
| SiH group-containing compound [C-8] | | | 4.5 |
| Platinum-1,3,5,7-tetravinylmethylcyclosiloxane complex | 0.4 | 0.4 | 0.4 |
| 1-Ethynyl-1-cyclohexanol | 0.1 | 0.1 | 0.1 |
| Crosslinked rubber properties | | | |
| Hardness | 32 | 34 | 38 |
| Strength properties | | | |
| Tensile strength at break (MPa) [S] | 2.8 | 2.9 | 3 |
| Tensile elongation at break (%) [E] | 530 | 500 | 240 |
| [S × E] | 1484 | 1450 | 720 |
| Compression set (120° C. × 168 hrs) (%) | 30 | 33 | 65 |
| Leakage property test | ○ | ○ | X |
| Bonding property test | ○ | ○ | ○ |
| Moldability test | ○ | ○ | ○ |
| Volume intrinsic resistivity (Ω · cm) | $10^{13}$ | $10^{13}$ | $10^{13}$ |

Comments on Examples 8 and 9 and Comparative Example 2

In Examples 8 and 9, the numerical value of "tensile strength at break×tensile elongation at break" was larger than that in Comparative Example 2, and the rubber sheets in Examples 8 and 9 have proved to be hardly torn off in the production process. Further, the rubber sheets in Examples 8 and 9 have proved to be excellent also in compression set and leakage properties. On the other hand, in Comparative Example 2, the numerical value of "tensile strength at break× tensile elongation at break" was small, and the rubber sheet in this example is liable to be torn off in the production process and is undesirable as a gasket for a top cover of a hard disc drive. The rubber sheet in Comparative Example 2 is inferior also in compression set and leakage properties.

EXAMPLE 10

In a 2-liter planetary mixer (manufactured by Inoue Manufacturing Co., Ltd., trade name: PLM-2 model), 100 parts by weight of the copolymer [A-1], 15 parts by weight of carbon black (available from Asahi Carbon Co., Ltd., trade name: F-200) and 35 parts by weight of silica (available from Tatsumori Ltd., trade name: Crystalite) were blended to obtain a blend.

Figure 3:
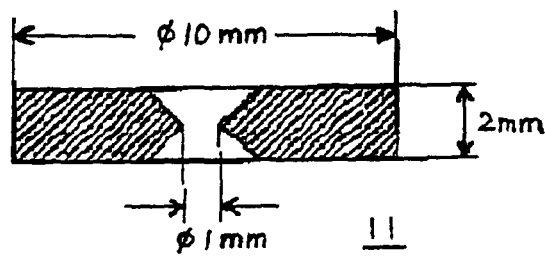
FIG. 3 is a sectional view of a test specimen used in Examples 10 and 11 and Comparative Example 3.

To 150 parts by weight of the blend, 5 parts by weight of the aforesaid SiH group-containing compound [C-1] (crosslinking agent), 0.1 part by weight of ethynylcyclohexanol as a reaction inhibitor and 0.4 part by weight of a platinum-1,3,5,7-tetravinylmethylcyclosiloxane complex (platinum concentration: 0.5% by weight, terminal vinylsiloxane oil solution) were added, and they were milled 7 times by means of three rolls having a diameter of 3 inches (manufactured by Kodaira Seisakusho Co., Ltd., trade name: Three-roll mill), and then a pressure was applied at 150° C. for 10 minutes by the use of a 50-ton press-molding machine to obtain a vulcanized rubber sheet (150 mm×150 mm×2 mm) and a test specimen for sealing test shown in FIG. 3. The resulting vulcanized rubber sheet was evaluated on the following properties. The results are set forth in Table 4.

(1) Original State Properties

Tests were carried out in accordance with JIS K6253 and JIS K6251 to measure original state properties (durometer A hardness, tensile strength, elongation). Further, a value of "tensile strength×elongation" was determined.

(2) Sealing Test

Figure 4:
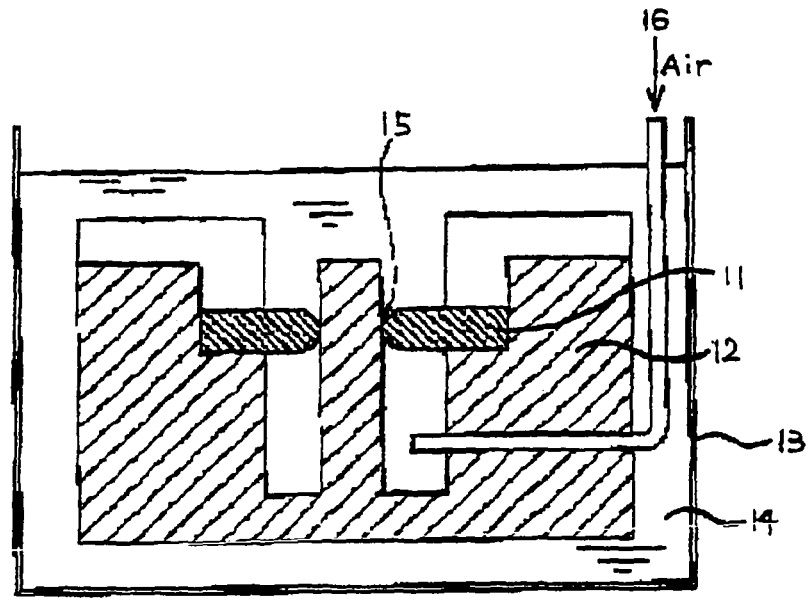
FIG. 4 is a schematic view to explain a sealing test that is carried out using the test specimen shown in FIG. 3.

After occurrence of initial leakage was observed by the use of a jig shown in FIG. 4, the test specimen 11 set on a jig was placed in an oven at 100° C., then taken out each 100 hours and subjected to the same sealing test (leakage test) as initially made until 1000 hours passed. In this sealing test, the jig 12 on which the test specimen 11 was set was placed in water 14 contained in a water bath 13, then an air pressure of 0.1 MPa was applied as indicated by an arrow 16, and occurrence of leakage from the seal area 15 was observed.

(3) Outgassing Test

The quantity of siloxane produced when a vulcanized rubber sheet of 50 mm×20 mm×2 mm was heated at 100° C. for 1 hour was measured by a head-space method using GC-MS.

EXAMPLE 11

A crosslinked rubber sheet was obtained in the same manner as in Example 10, except that 7.9 parts by weight of the SiH group-containing compound [C-2] was used instead of 5 parts by weight of the SiH group-containing compound [C-1] used in Example 10. Then, evaluation of the rubber sheet was carried out. The results are set forth in Table 4.

COMPARATIVE EXAMPLE 3

A crosslinked rubber sheet was obtained in the same manner as in Example 10, except that 4.5 parts by weight of the SiH group-containing compound [C-8] was used instead of 5 parts by weight of the SiH group-containing compound [C-1] used in Example 10. Then, evaluation of the rubber sheet was carried out. The results are set forth in Table 4.

TABLE 4

|  | Ex. 10 | Ex. 11 | Comp. Ex. 3 |
| --- | --- | --- | --- |
| Blending |  |  |  |
| Copolymer A-1 | 100 | 100 | 100 |
| Carbon black (available from Asahi Carbon Co., Ltd., trade name: F-200) | 15 | 15 | 15 |
| Silica (available from Tatsumori Ltd., trade name: Crystalite) | 35 | 35 | 35 |
| SiH group-containing compound [C-1] | 5 |  |  |
| SiH group-containing compound [C-2] |  | 7.9 |  |
| SiH group-containing compound [C-8] |  |  | 4.5 |
| Platinum-1,3,5,7-tetravinylmethylcyclosiloxane complex | 0.4 | 0.4 | 0.4 |
| 1-Ethynyl-1-cyclohexanol | 0.1 | 0.1 | 0.1 |
| Crosslinked rubber properties |  |  |  |
| Strength properties |  |  |  |
| Tensile strength at break (MPa) [S] | 3.4 | 3.3 | 3.4 |
| Tensile elongation at break (%) [E] | 450 | 430 | 210 |
| [S × E] | 1530 | 1419 | 714 |
| Durometer A hardness | 40 | 42 | 47 |
| Sealing properties |  |  |  |
| Initial stage | none | none | none |
| After 200 hrs | none | none | none |
| After 400 hrs | none | none | none |
| After 600 hrs | none | none | none |
| After 800 hrs | none | none | somewhat observed |
| After 1000 hrs | none | none | observed |
| Outgassing test (ppm) | <10 | <10 | 20 or more |
| Volume intrinsic resistivity ($\Omega \cdot cm$) | $10^{13}$ | $10^{13}$ | $10^{13}$ |

Comments on Examples 10 and 11 and Comparative Example 3

In Examples 10 and 11, the numerical value of "tensile strength at break×tensile elongation at break" was larger than that in Comparative Example 3, and the rubber sheets in Examples 10 and 11 have proved to be hardly torn off in the production process. Further, the rubber sheets in Examples 10 and 11 have proved to be excellent also in compression set, sealing properties and resistance to outgassing. On the other hand, in Comparative Example 3, the numerical value of "tensile strength at break×tensile elongation at break" was small, and the rubber sheet in this example is liable to be torn off in the production process and is undesirable. The rubber sheet in Comparative Example 3 is inferior also in compression set, sealing properties and resistance to outgassing.

INDUSTRIAL APPLICABILITY

The present invention can be applied to (1) a fuel cell sealing part, which is excellent in mechanical properties, sealing properties, heat resistance and acid resistance, and a fuel cell having the part, (2) a hard disc drive top cover gasket part, which has low hardness, is excellent in mechanical properties, heat resistance, compression set properties and leakage properties and exhibits excellent sealing properties over a long period of time, and a hard disc drive having the part, and (3) an electric wire connector sealing part, which is free from oil breeding and is excellent in mechanical properties, resistance to outgassing, sealing properties against electric wires and insertion properties, and an automobile electric wire connector having the part.

The invention claimed is:

1. A rubber composition comprising:
an ethylene/α-olefin/non-conjugated polyene copolymer [A] satisfying the following (a) to (f):
(a) the copolymer [A] is a copolymer of ethylene, an α-olefin and a non-conjugated polyene,
(b) the number of carbon atoms of the α-olefin is in the range of 3 to 20,
(c) the ethylene unit/α-olefin unit weight ratio is in the range of 35/65 to 95/5,
(d) the iodine value is in the range of 0.5 to 50,
(e) the intrinsic viscosity [η], as measured in a decalin solution at 135° C., is in the range of 0.01 to 5.0 dl/g, and
(f) the non-conjugated polyene is at least one norbornene compound represented by the following formula [I]:

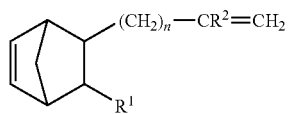

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms, and
a SiH group-containing compound [C] which has two SiH groups in one molecule and is represented by the following formula [III]

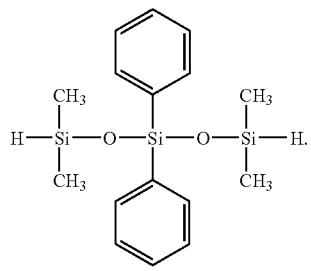

2. The rubber composition as claimed in claim 1, which further comprises an organopolysiloxane [B] having, as a mean composition formula, the following formula [S]:

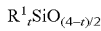 [S]

wherein $R^1$ is a monovalent hydrocarbon group of 1 to 10 carbon atoms, a part or all of hydrogen atoms of the monovalent hydrocarbon group may be replaced with cyano groups or halogen atoms, and t is a number of 1.9 to 2.1,
in said rubber composition, the [A]:[B] weight ratio being in the range of 99.9:0.1 to 5:95.

3. A rubber composition comprising:
an ethylene/α-olefin/non-conjugated polyene copolymer [A] satisfying the following (a) to (f):
(a) the copolymer [A] is a copolymer of ethylene, an α-olefin and a non-conjugated polyene,
(b) the number of carbon atoms of the α-olefin is in the range of 3 to 20,
(c) the ethylene unit/α-olefin unit weight ratio is in the range of 35/65 to 95/5,
(d) the iodine value is in the range of 0.5 to 50,
(e) the intrinsic viscosity [η], as measured in a decalin solution at 135° C., is in the range of 0.01 to 5.0 dl/g, and (f) the non-conjugated polyene is at least one norbornene compound represented by the following formula [I]:

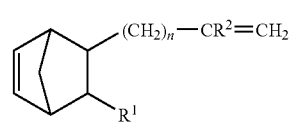

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms, and
a SiH group-containing compound [C] which has two SiH groups in one molecule and is represented by the following formula [IV]:

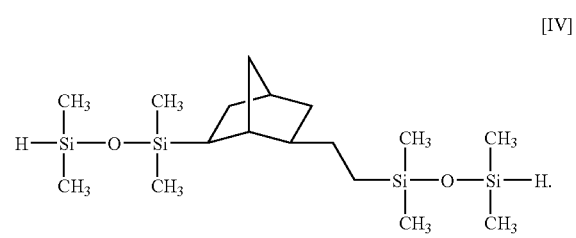

4. A fuel cell sealing member comprising the rubber composition of claim 1.

5. The fuel cell sealing member as claimed in claim 4, which is void-free.

6. The fuel cell sealing member as claimed in claim 4, which has a volume intrinsic resistivity of not less than $1 \times 10^{10}$ Ω·cm.

7. A fuel cell having the fuel cell sealing member of claim 4.

8. A hard disc drive top cover gasket comprising the rubber composition of claim 1.

9. The hard disc drive top cover gasket as claimed in claim 8, which is void-free.

10. The hard disc drive top cover gasket as claimed in claim 8, wherein a hard disc drive top cover and a gasket are united in one with an adhesive.

11. A hard disc drive having the hard disc drive top cover gasket of claim 8.

12. An electric wire connector sealing member comprising the rubber composition of claim 1.

13. The electric wire connector sealing member as claimed in claim 12, which has a durometer A hardness of not more than 45.

14. An electric wire having the electric wire connector sealing member of claim 12.

15. A rubber composition comprising:
an ethylene/α-olefin/non-conjugated polyene copolymer [A] satisfying the following (a) to (f):
(a) the copolymer [A] is a copolymer of ethylene, an α-olefin and a non-conjugated polyene,
(b) the number of carbon atoms of the α-olefin is in the range of 3 to 20,
(c) the ethylene unit/α-olefin unit weight ratio is in the range of 35/65 to 95/5,
(d) the iodine value is in the range of 0.5 to 50,
(e) the intrinsic viscosity [η], as measured in a decalin solution at 135° C., is in the range of 0.01 to 5.0 dl/g, and (f) the non-conjugated polyene is at least one norbornene compound represented by the following formula [I]:

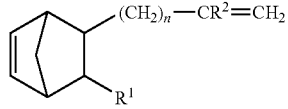
[I]

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms, and a SiH group-containing compound [C] which has two SiH groups in one molecule and is selected from the group consisting of

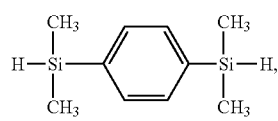
[C-5]

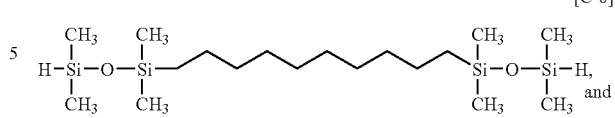
[C-6]
and

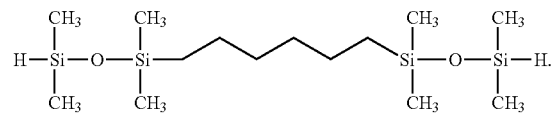
[C-7]

* * * * *